(12) United States Patent
Büermann et al.

(10) Patent No.: US 6,688,972 B2
(45) Date of Patent: Feb. 10, 2004

(54) COMBINE WITH CHOPPER ARRANGEMENT

(75) Inventors: Martin Büermann, Haunsheim (DE); Gerd Bernhardt, Bannewitz/Hänichen (DE); Siegfried Firus, Dresden (DE); André Heinrich, Löbau (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/024,434

(22) Filed: Dec. 20, 2001

(65) Prior Publication Data

US 2002/0077163 A1 Jun. 20, 2002

(30) Foreign Application Priority Data

Dec. 20, 2000 (DE) .......................... 100 63 550

(51) Int. Cl.[7] ................................ A01F 12/40
(52) U.S. Cl. ........................ 460/112; 56/503
(58) Field of Search ................ 460/111, 112, 460/2; 56/500, 503, 504, 505, 12.3; 241/101.76, 190, 194

(56) References Cited

U.S. PATENT DOCUMENTS

| | | | |
|---|---|---|---|
| 2,280,677 A | 4/1942 | Wagner et al. | 146/111 |
| 2,719,556 A | 10/1955 | Summerville et al. | 146/108 |
| 2,848,238 A | 8/1958 | Stevens | 275/3 |
| 2,932,145 A | 4/1960 | Scranton | 56/122 |
| 4,292,795 A | 10/1981 | Linn | 56/503 |
| 4,836,456 A * | 6/1989 | van der Lely | 239/682 |
| 4,913,679 A * | 4/1990 | Bender | 460/112 |
| 4,917,652 A * | 4/1990 | Glaubitz et al. | 460/111 |
| 5,021,028 A * | 6/1991 | Kersting et al. | 460/85 |
| 5,501,635 A * | 3/1996 | Niermann | 460/112 |
| 5,556,042 A | 9/1996 | Roberg | 241/101.76 |
| 6,105,347 A | 8/2000 | Behnke | 56/10.2 J |
| 6,126,098 A * | 10/2000 | Schrattenecker | 241/47 |
| 6,331,142 B1 * | 12/2001 | Bischoff | 460/112 |
| 6,354,938 B1 * | 3/2002 | Schrattenecker | 460/112 |
| 6,416,405 B1 * | 7/2002 | Niermann | 460/79 |
| 6,498,207 B1 * | 12/2002 | Hoshikawa et al. | 524/378 |

FOREIGN PATENT DOCUMENTS

| | | |
|---|---|---|
| CA | 1088838 | 11/1980 |
| CA | 1185866 | 4/1985 |
| DE | 10 79 878 | 4/1960 |
| DE | 1 295 913 | 5/1969 |
| DE | 36 15 151 A1 | 11/1987 |
| DE | 37 02 192 A1 | 8/1988 |
| DE | 43 21 905 A1 | 1/1995 |
| DE | 195 35 175 A1 | 3/1996 |
| DE | 196 01 421 A1 | 7/1997 |
| DE | 298 02 648 U1 | 5/1998 |
| EP | 0 631 717 A1 | 1/1995 |
| FR | 2 700 661 A1 | 7/1994 |

OTHER PUBLICATIONS

Brochure–"Don Grain Combines"; 1986; 4 pages.

* cited by examiner

*Primary Examiner*—Árpád Fab Kovács

(57) ABSTRACT

A combine having a chopper arrangement for receiving and chopping harvested crop material that has been threshed and separated. The chopper arrangement comprises a web wheel disk having knives entrained thereon that cooperate with a stationary shear bar to chop the harvested crop material that has been threshed and separated.

9 Claims, 5 Drawing Sheets

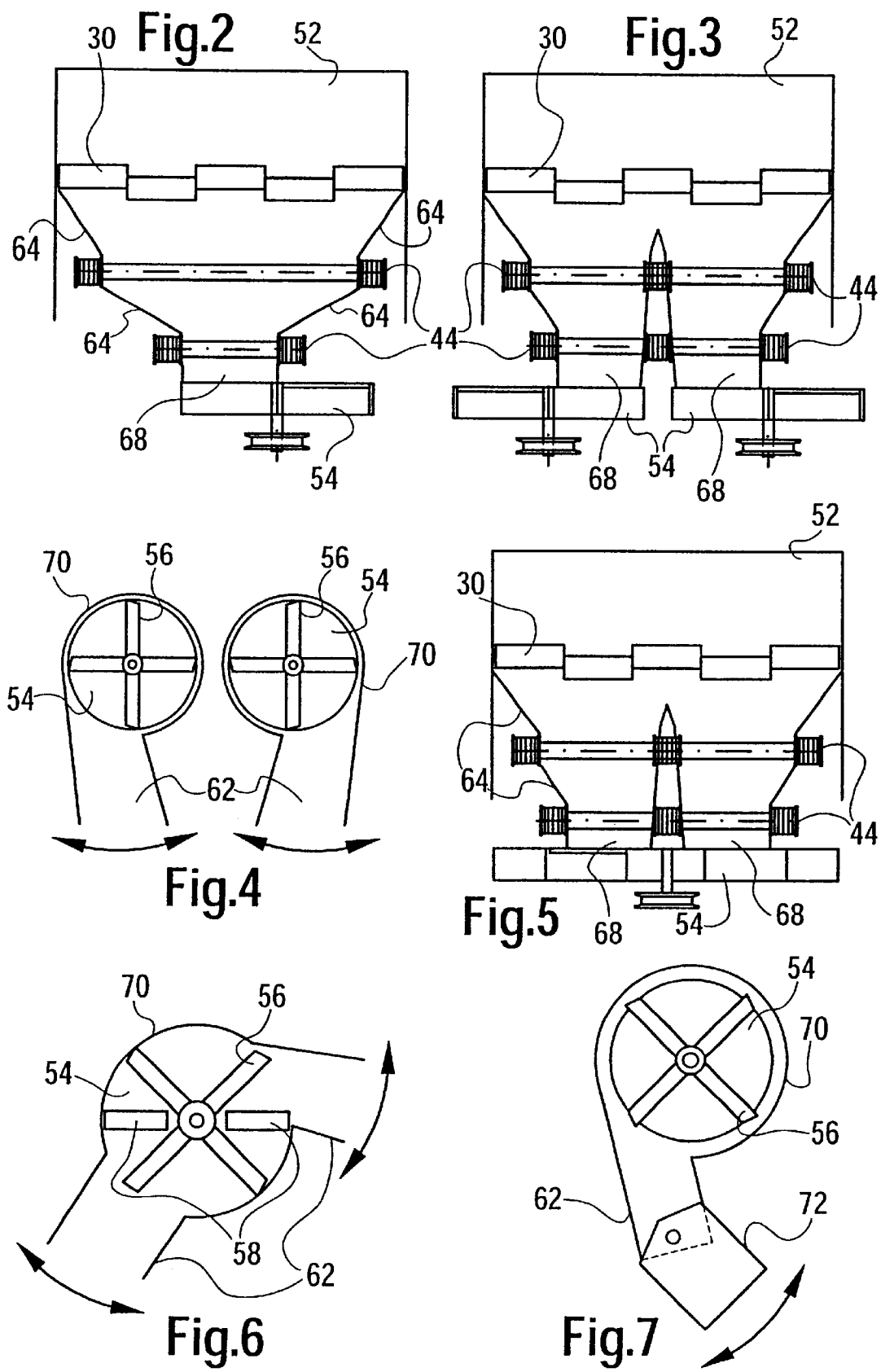

COMBINE WITH CHOPPER ARRANGEMENT

FIELD OF THE INVENTION

The invention is directed to a chopper arrangement on a combine comprising a web wheel disk having knives entrained thereon.

BACKGROUND OF THE INVENTION

Straw choppers are used on combines to chop harvested crop material that has been threshed and separated. The straw chopper receives the crop material from the separating assembly and chops the crop material into smaller parts before depositing the chopped crop material onto the field. Known straw choppers are typically equipped with knives supported in bearings pendulously on a rotating body that cut the harvested crop remains in interaction with stationary shear bars. The power requirements are relatively high and the degree of size reduction of the remains is not always adequate.

An undated advertisement for a "Don Grain Combine" discloses a drum chopper that can be attached as a straw chopper to the rear side of a combine. The same drum chopper can also be attached to a corn header, in order to chop the harvested crop remains and conduct them into a container or to deposit them on the field.

DE-196 01 421-A describes a corn header in which the ears of corn are conducted to a combine. The plant stems are processed by means of a web disk wheel chopper.

SUMMARY OF THE INVENTION

It is an object of the present invention to provide a chopper arrangement for a combine having a low power requirement and a high degree of size reduction of the chopped material.

The large components of harvested crop material that has been threshed and separated by the combine are directed to a chopper arrangement located downstream from the separating assembly. The chopper arrangement is provided with a web disk wheel having radially extending knives entrained thereon. The desired length of the chopped crop material can be controlled by controlling the supply velocity of the crop material to be chopped. This results in a large ejection trajectory and relatively low power requirements.

In the preferred embodiment, the chopper contains at least one web disk wheel having entrained knives that is brought into rotation about a predominantly vertical axis. Thereby, the harvested crop remains can be supplied from above and can be ejected to the rear or to the side in a horizontal direction with respect to the orientation of the combine.

In principle, it would be conceivable to conduct the harvested crop remains to the web disk wheel by the action of gravity alone. However, the harvested crop remains produced by the threshing and separating arrangement of the combine are preferably conducted to the web disk wheel chopper by at least two interacting supply rolls which rotate in opposite directions and between which the harvested crop remains are conveyed. The supply rolls precompress the crop material and forcibly conduct the material to the web disk wheel. Thereby the harvested crop remains are supplied to the web disk wheel chopper in an orderly manner as a mat. It is also conceivable that two pairs of supply rolls be arranged one pair behind the other in the direction of material flow, or to employ an odd number of supply rolls. Rolls with tines or a reaping device in the form of a reel could also be employed as supply rolls.

To control the length of cut, the rotational speed of the supply rolls can be adjustable. An infinitely variable cutting length gearbox can be used to control the supply speed to the chopper arrangement. As an alternative, a gear box having different speeds can also be used.

The use of driven supply rolls makes it possible to provide a shear bar at the inlet of the chopper arrangement. This results in a clean cut with low power requirements.

In case the capacity of a chopper arrangement with only one web disk wheel is not sufficient, an obvious solution would be to arrange two web disk wheels alongside one another. Their axes of rotation can extend parallel or be inclined to each other. It is conceivable that the two web disk wheels be installed in a common housing or to employ two separate housings.

It is also conceivable that a relatively large web disk wheel can be used that is supplied by two inlets that are opposite one another, each of which is supplied with a part of the flow of the crop material. A single such web disk wheel could be used, or two (or even more) smaller ones could be arranged alongside one another.

In a preferred embodiment, the housing of the chopper arrangement is provided with one or more ejection ducts through which the chopped crop material is ejected. The ejection duct, or an end piece mounted to the duct, can be pivoted about a vertical axis in order to eject the chopped crop material in differing directions. The pivoting movement can be continuous in order to distribute the harvested crop remains over the width of a swath taken up by the combine. It is also conceivable that the ejection duct or ducts could be pivoted on the basis of the wind direction or the inclination of the terrain, and to leave them in a fixed position on the basis of a measured condition or provided as input by an operator.

Fundamentally, a web disk wheel is sensitive to foreign objects. In a combine, metallic parts frequently reach the chopper arrangement. These parts may originate with the combine itself, such as crop lifters, intake fingers or pegs of a separator rotor. Therefore, it is preferred that a foreign object detection arrangement be located along the flow of the harvested crop remains upstream from the chopper arrangement. This detector can recognize any foreign objects contained in the flow of the crop material from the separating assembly. The detector controls an arrangement that stops the flow of the crop material (interrupts) or deflects the flow of crop material when a foreign object is detected, so that the foreign object does not reach the web disk wheel. When the foreign object detection arrangement has performed an interruption of the flow of the crop material, the operator can then remove the foreign object before renewing operations. If the flow of crop material is redirected past the chopper arrangement, then the flow of the harvested crop remains can again be automatically conducted into the chopper arrangement, as soon as a sufficiently long time interval has elapsed after the detection of the foreign object. In this way, an interruption of the operation of the combine is avoided. The foreign object detection arrangement may, for example, be configured as an inductive metal detector or operate as an ultra-sonic device, or any other appropriate configuration.

BRIEF DESCRIPTION OF THE DRAWINGS

FIG. 2 is a rear view of the chopper arrangement of FIG. 1.

FIG. 3 is a rear view of a second embodiment of a chopper arrangement.

FIG. 4 is a top view of the chopper arrangement of FIG. 3.

FIG. 5 is a rear view of a third embodiment of the chopper arrangement.

FIG. 6 is a top view of the chopper arrangement of FIG. 5.

FIG. 7 shows a top view of a fourth embodiment of a chopper arrangement.

DETAILED DESCRIPTION

Figure 1:
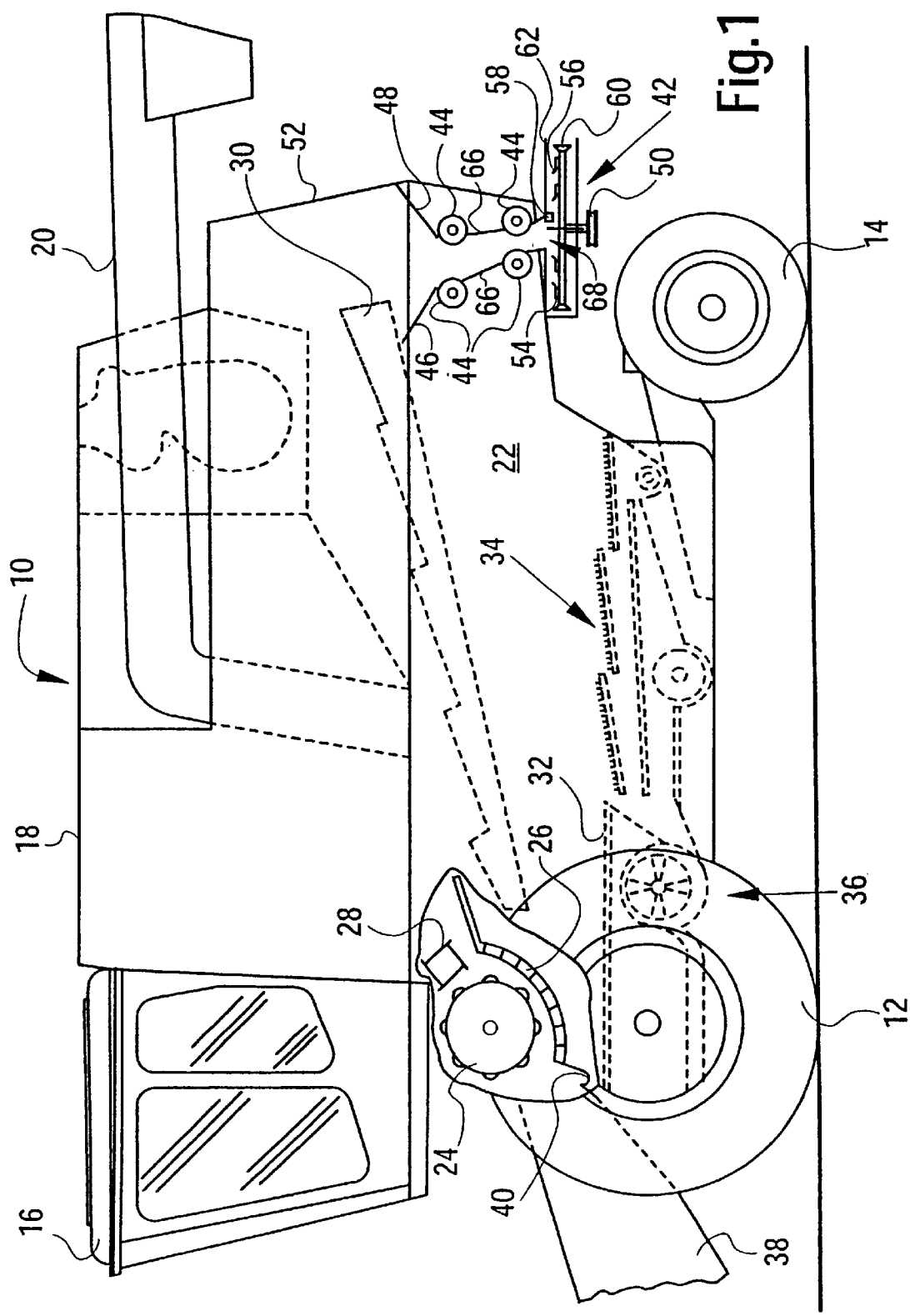
FIG. 1 is a semi-schematic side view of a combine with a first embodiment of a chopper arrangement.

A combine 10, shown in FIG. 1, is supported on front driven and rear steerable wheels 12 and 14, respectively, and is provided with an operator's cab 16 from which it can be controlled by an operator. A grain tank 18 is located behind the operator's cab 16. The grain tank 18 is provided with an unloading auger 20 through which clean grain from the grain tank can be transferred to an awaiting grain cart or truck. The grain tank 18 is supported on a frame 22 formed by left and right side sheets. Harvested crop material is directed from a harvesting assembly, not shown, by the feeder house 38 past stone trap 40 into the interior of the combine formed by the left and right side sheets. The interior of the combine is provided with a threshing assembly, a separating assembly and a cleaning assembly. The threshing assembly separates the harvested crop material into its large and small components. The threshing assembly comprises a threshing cylinder 24, a concave 26, and a beater 28. Large components having small components, like grain, entrained therein are directed by the threshing assembly to the separating assembly. The separating assembly releases the trapped grain from the large components. In the illustrated embodiment, the separating assembly comprises straw walkers 30. The small components, such as grain and chaff, fall onto grain pan 32 from the concave 26 and from straw walkers 30. The grain pan 32 directs the small components to the cleaning assembly. The cleaning assembly comprises sieves 34 and blower 36. Chaff is blown out the rear of the combine by blower 36, whereas clean grain is collected on the floor of the combine where it is collected and directed to the grain tank 18 by a clean grain elevator, not shown. The large crop components are conducted over the straw walkers 30 to straw guide vanes 46 and 48. The straw guide vanes 46 and 48 direct the large crop components to a chopper arrangement 42 located beneath a straw exhaust hood 52. It would also be conceivable to conduct the chaff to the chopper arrangement 42 in order to distribute the chaff over a wide region of the field. Although the present invention is described as being used with a combine having a separating assembly comprising straw walkers, this invention could also be used on combines having rotary separating assemblies.

The straw walkers 30 free the trapped small crop components (grain) from the large crop components. After separation, the large crop components pass over the rear of the straw walkers 30 and guided by guide vanes 46 and 48 are directed into the straw chopper 42. Guide vane 48 is attached to the rear wall of the straw exhaust hood 52. Immediately below the guide vanes 46 and 48 are an upper pair of interacting supply rolls 44, that are rotated in opposite directions. The upper supply rolls 44 convey the harvested crop remains downward and further guide the large crop components to a lower pair of supply rolls 44, which are also rotated in opposite directions and convey the crop material downward. The supply rolls 44 may be provided with smooth or profiled surfaces. Between the upper and the lower supply rolls 44 the flow of harvested crop remains is guided by guide vanes 66. The lower supply rolls 44 conduct the harvested crop remains as a mat with a definite velocity to the inlet 68 of the chopper arrangement 42. The chopper 42 is configured as a web disk wheel chopper.

The web disk wheel chopper includes a web disk wheel 54 that can rotate about a central, vertical axis. The web disk wheel 54 is rotated by a belt pulley 50. Belts and additional transmission elements operationally extend between the main propulsion engine of the combine and belt pulley 50. The web disk wheel 54 is rotatably supported on its upper side and its lower side on bearings, not shown, on the frame 22. A number of knives 56 are distributed uniformly across the upper side of the web disk wheel 54, which are provided with cutting edges oriented approximately in the radial direction. The knives 56 in conjunction with a stationary shear bar 58 engage the large crop components entering the chopper 42 through the inlet opening 68 to chop the large crop components. The lengths to which the large crop components are cut is determined by the conveying velocity of the lower supply rolls 44, the rotational speed of the web disk wheel 54 and the number of knives 56 mounted to the disc wheel 54. A number of paddles 60 are distributed over the circumference of the web disk wheel 54. The paddles 60 eject the chopped crop material through an ejection duct 62 to the rear of the combine and onto the field.

In FIG. 2 it can be seen that the flow of the harvested crop remains is guided by straw guide vanes 64 at the sides. Guide vanes 64 narrow the crop material path as it flows downward. The guide vanes 64 form a funnel by narrowing the sides of the crop material path. The crop material path is also narrowed in the fore/aft direction as the spacing between the lower supply rolls 44 is less than the spacing between the upper supply rolls 44. The lower supply rolls 44 are preferably driven faster than the upper supply rolls 44, in order to avoid a blockage of the harvested crop remains. Due to the narrowing at the sides by guide vanes 64 the lower supply rolls 44 are shorter than the upper supply rolls 44.

FIG. 3 shows a second embodiment of a chopper arrangement according to the invention, in which two web disk wheel choppers 54 are arranged alongside one another in order to increase the chopper capacity. Accordingly, in each case two pairs of lower supply rolls 44 and upper supply rolls 44 are provided. In this embodiment, the flow of the crop material is also narrowed as it passes downward in the funnel formed by the guides and rollers. The choppers of the second embodiment are shown in FIG. 4 and comprise the star-shaped, radial arrangement of the knives 56 on the web disk wheel 54. Furthermore, it is evident that the web disk wheels 54 are arranged in separate housings 70 to which the ejection ducts 62 with their rectangular cross section are formed or attached. The ejection ducts 62 together with the housing 70 can be pivoted about the rotational axis of the web disk wheels 54, as is indicated by the arrows. This pivoting action controls the direction of ejected chopped crop material. The ejection ducts 62 can be brought into a predetermined position manually, or by an appropriate drive, or they may be continuously pivoted to the left and right, in order to evenly distribute the chopped crop material over the field.

FIG. 5 shows a third embodiment of a chopper arrangement according to the invention. As in the second embodiment, the flow of the crop material is divided into two flow paths that narrow downward in the form of a funnel. Correspondingly, two pairs of upper and lower supply rolls 44 are also provided. In contrast to the second embodiment, only a single web disk wheel 54 is provided, to which the crop is conducted through two inlets 68. The two inlets 68 are located on opposite sides of the vertical axis of rotation of the web disk wheel 54 opposite each other. As illustrated in FIG. 6, each of the inlets 68 is located adjacent to a shear bar 58. The knives 56 of the web disk wheel 54 cut the harvested crop remains by interaction with the shear bars 58. The housing 70 of the third embodiment comprises two parts, each of which carries an ejection duct 62. The two parts can be pivoted together with the housing 70 or separately and sliding along each other in the direction of the arrows about a vertical axis.

Figure 11:
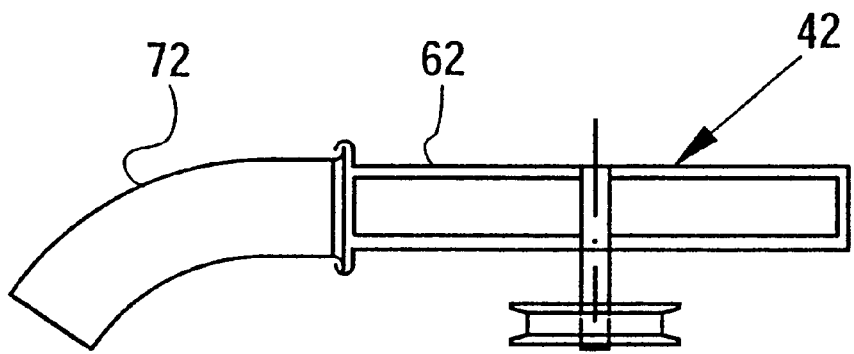
FIG. 11 is a rear view of a seventh embodiment of a chopper arrangement.

FIG. 7 shows a fourth embodiment of a chopper arrangement according to the invention. The web disk wheel 54 corresponds to that already described and can be combined with each of the previously described embodiments of the invention. In contrast to the other embodiments, the ejection duct 62 may be equipped with an end piece 72 that can be pivoted about a vertical axis, as indicated by the arrow, in order to control the ejection of chopped crop material. It is also conceivable that the end piece 72 may be bent and configured to rotate about the longitudinal axis of the ejection duct 62 or about an axis perpendicular thereto, as with the embodiment of the invention shown in FIG. 11.

Figure 8:
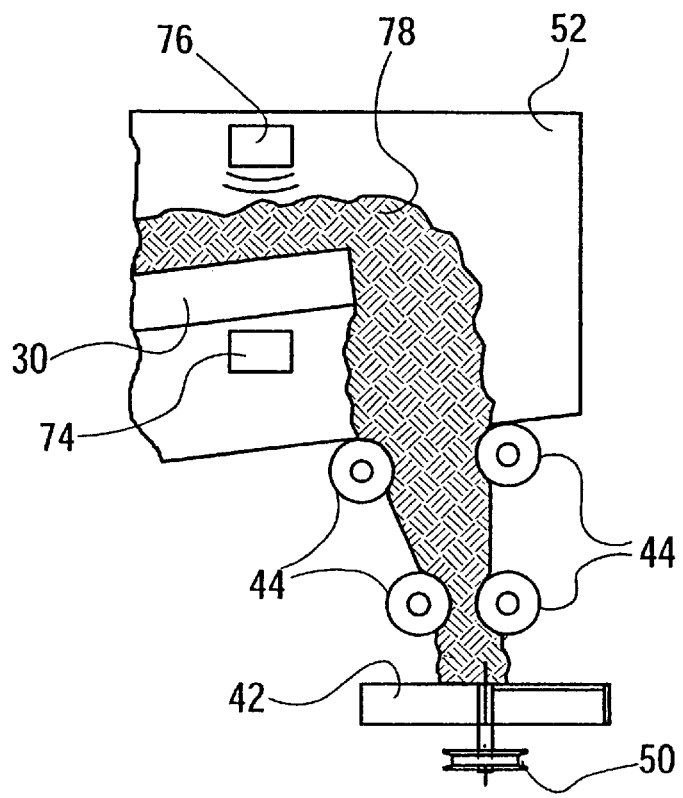
FIG. 8 is a side view of a fifth embodiment of a chopper arrangement.
Figure 9:
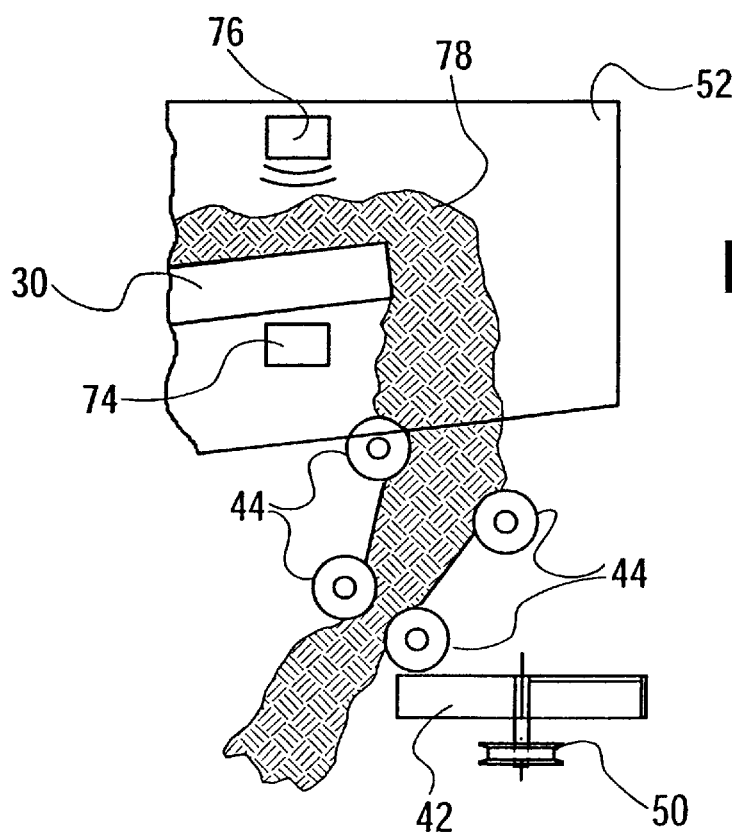
FIG. 9 is a side view of the chopper arrangement of FIG. 8 with the flow of the harvested crop conducted past the chopper arrangement.

A fifth embodiment of the chopper arrangement is shown in FIGS. 8 and 9. A foreign object detection arrangement is provided which includes a permanent magnet 76 and an induction coil 74. It is arranged to detect any possible foreign objects contained in the crop material mat 78 of the large crop components that are to be chopped. The permanent magnet 76 generates a magnetic field that influences the induction coil 74. A foreign object that could be contained in the crop material mat 78, particularly if it contains ferro-magnetic material, changes the flux density of the magnetic field so that an induction signal is generated in the induction coil 74. In such a case, a control connected to the induction coil 74, not shown, forces a carrier that retains the supply rolls 44, out of the operating position shown in FIG. 8, into the position shown in FIG. 9. In FIG. 9 the crop material mat 78 is conducted past the chopper 42 and deposited onto the field. It would also be conceivable to pivot the supply rolls 44 to the rear opposite from that illustrated in FIG. 9, so that the crop material mat 78 slides along the upper side of the housing 70 of the chopper 42 before falling downward onto the field. After a certain time interval has elapsed, that corresponds at least to the time it takes the foreign object to reach the chopper 42, the control can return the carrier with the supply rolls 44 to its initial operating position shown in FIG. 8. In this way an interruption of the operation of the combine 10 can be avoided.

The pivoting of the carrier for the supply rolls 44 can also be used to shift between chopper operation and windrow depositing operation. It is also conceivable that the entire chopper arrangement can be slid to the rear and/or pivoted to the rear for the windrow depositing operation.

Figure 10:
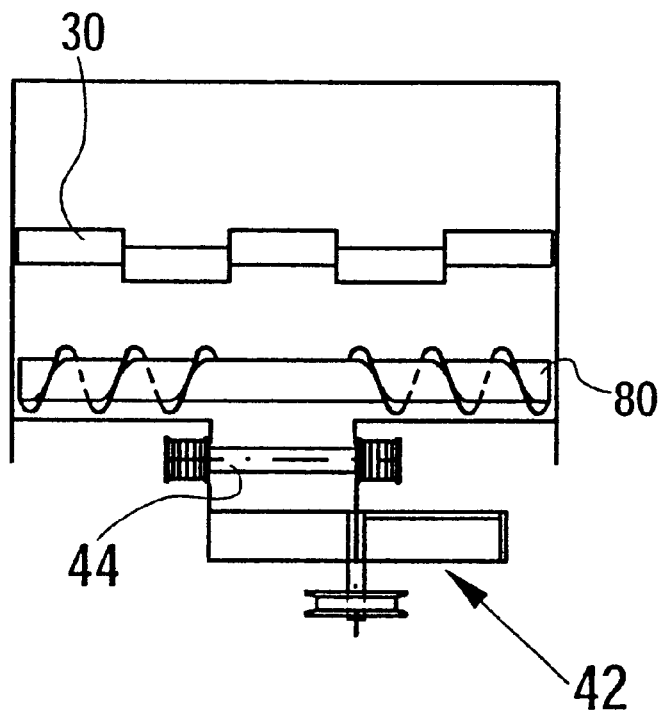
FIG. 10 is a rear view of a sixth embodiment of a chopper arrangement.

FIG. 10 shows a sixth embodiment of a chopper arrangement. The large crop components ejected by the straw walkers 30 are conveyed by a rotary screw conveyor 80 to the center of the combine 10. From there the large crop components are conducted downward to a pair of supply rolls 44 that are spaced horizontally and arranged behind each other in the fore/aft direction. The supply rolls 44 convey the large crop components downward to the chopper 42.

Figure 12:
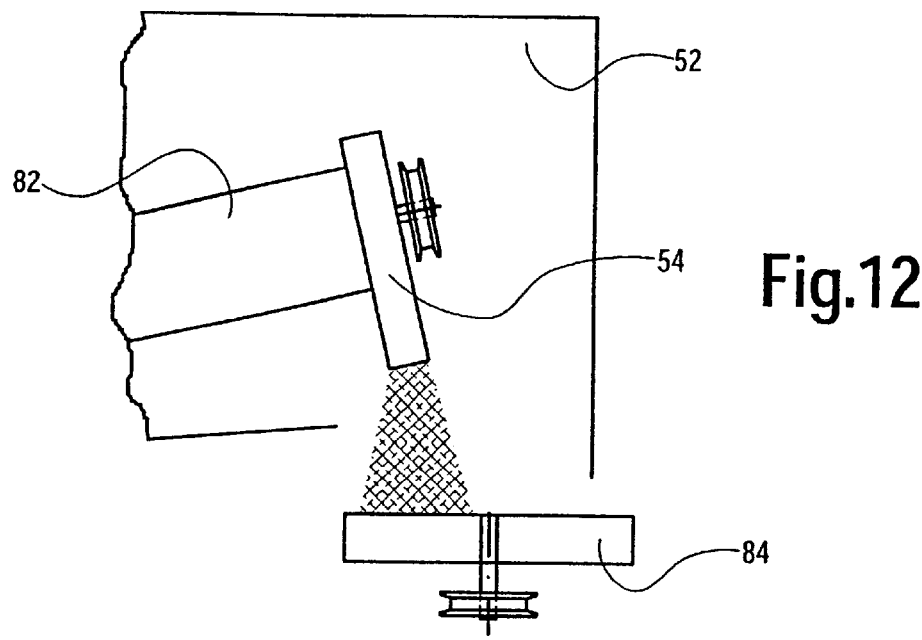
FIG. 12 is a side view of an eighth embodiment of a chopper arrangement.
Figure 13:
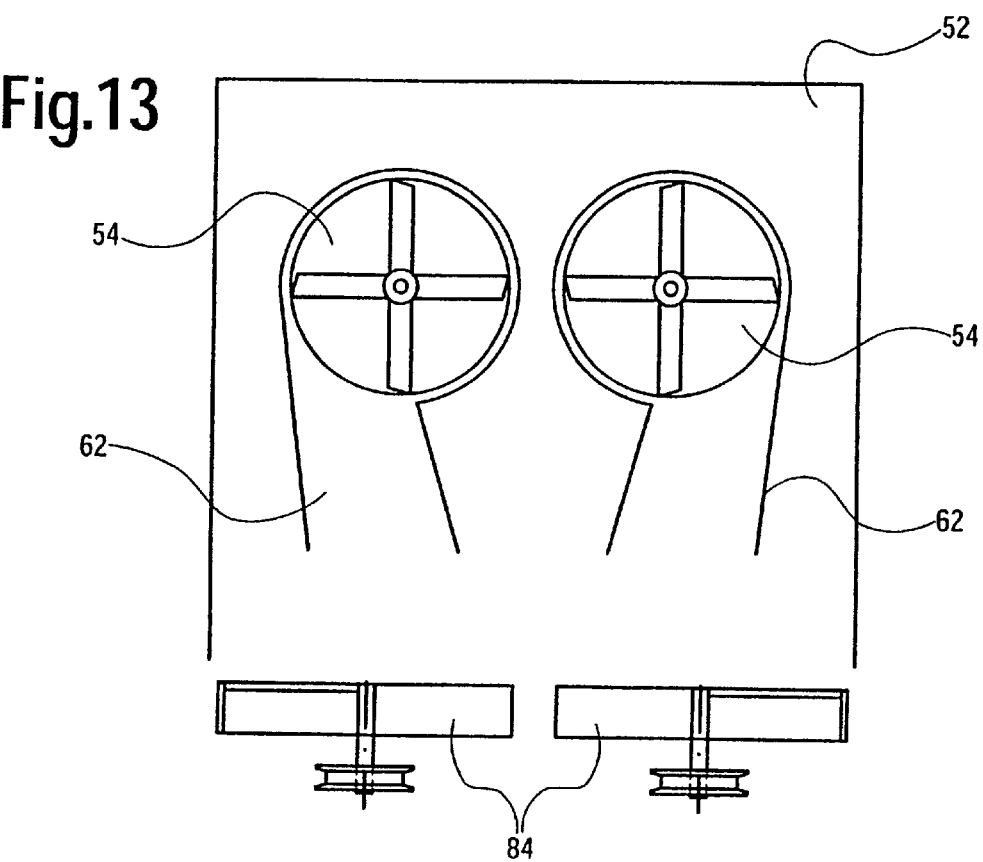
FIG. 13 is a top view of the chopper arrangement of FIG. 12.

FIGS. 12 and 13 show an eighth embodiment of the invention. The web disk wheel 54 is arranged on the rear of a rotor 82 of a combine 10 and rotates about an axis that extends parallel or even coaxial to the axis of rotation of the rotor 82. The rotor 82 may be a threshing and separating rotor, or it may be the rotor of a hybrid combine with a transverse threshing cylinder and two axial separating rotors arranged alongside each other. In FIG. 13 it can be seen that two rotors 82 are arranged alongside one another, each of which is followed by a web disk wheel 54. Each web disk wheel 54 takes up the harvested crop remains that are ejected by the rotor 82, reduces them and throws them downward through an ejection duct 62. There the harvested crop remains are distributed over a field by means of a distributing plate 84 that rotates about an approximately vertical axis. In this embodiment separate supply rollers are omitted.

Having described the preferred embodiment, it will become apparent that various modifications can be made without departing from the scope of the invention as defined in the accompanying claims.

What is claimed is:

1. A combine for threshing and separating a harvested crop material, the combine being provided with a chopper arrangement for chopping harvested crop material that has been threshed and separated wherein the chopper arrangement comprises at least one wheel having radially extending knives entrained thereon, the wheel is rotated about a predominantly vertical axis inside a housing having an inlet through which the harvested crop material that has been threshed and separated enters the chopper arrangement, the housing being provided with a shear bar adjacent to the inlet which cooperates with the knives to chop the harvested crop material that has been threshed and separated and a foreign object detection arrangement is arranged adjacent to the flow of the harvested crop material that has been threshed and separated upstream from the wheel, the foreign object detection arrangement is connected to a carrier arrangement for redirecting the flow of the harvested crop material that has been threshed and separated around the wheel when a foreign object is detected.

2. A combine as defined by claim 1 wherein the wheel is a web disk wheel.

3. A combine as defined by claim 2 wherein the harvested crop material that has been threshed and separated is supplied by a supply arrangement having at least one pair of counter-rotating supply rolls to the web disk wheel chopper through the inlet in the housing, where the supply rolls pre-compress and forcibly conduct the harvested crop material that has been threshed and separated to the web disk wheel.

4. A combine as defined by claim 3 wherein the rotational speed of the supply rolls can be varied in order to control the length of cut.

5. A combine as defined by claim 4 wherein at least two web disk wheels are arranged alongside one another.

6. A combine as defined by claim 4 wherein the housing of the chopper arrangement is provided with two inlets located opposite the predominantly vertical axis of the web disk wheel, a portion of the harvested crop material that has been threshed and separated is supplied to both inlets.

7. A combine as defined by claim 4 wherein the chopper arrangement is provided with an ejection duct that can be pivoted or rotated about a vertical axis.

8. A combine as defined by claim 4 wherein the chopper arrangement is provided with an ejection duct having an end piece that can be pivoted relative to the ejection duct.

9. A combine as defined by claim 4 wherein the chopper arrangement is provided with an ejection duct having an end piece that can be rotated relative to the ejection duct.

* * * * *